(No Model.) 6 Sheets—Sheet 1.

LA VERNE W. NOYES.
MACHINE FOR MAKING SPIRAL RIVETED PIPE.

No. 588,236. Patented Aug. 17, 1897.

Fig. 1

Witnesses:
A. F. Durand.
Asa G. Adams

Inventor:
La Verne W. Noyes
by Page & Belfield
attys.

(No Model.) 6 Sheets—Sheet 4.

LA VERNE W. NOYES.
MACHINE FOR MAKING SPIRAL RIVETED PIPE.

No. 588,236. Patented Aug. 17, 1897.

Witnesses:
A. F. Durand.
Asa G. Adams

Inventor:
La Verne W. Noyes
by Page & Belfield,
Attys.

(No Model.) 6 Sheets—Sheet 5.

LA VERNE W. NOYES.
MACHINE FOR MAKING SPIRAL RIVETED PIPE.

No. 588,236. Patented Aug. 17, 1897.

Fig. 7.

Witnesses:
A. F. Durand.
Asa G. Adams.

Inventor:
La Verne W. Noyes
by Page & Belfield
attys

UNITED STATES PATENT OFFICE.

LA VERNE W. NOYES, OF CHICAGO, ILLINOIS.

MACHINE FOR MAKING SPIRAL RIVETED PIPE.

SPECIFICATION forming part of Letters Patent No. 588,236, dated August 17, 1897.

Application filed February 4, 1897. Serial No. 621,940. (No model.)

*To all whom it may concern:*

Be it known that I, LA VERNE W. NOYES, a citizen of the United States, residing at Chicago, in the county of Cook and State of Illinois, have invented a certain new and useful Improvement in Machines for Making Spiral Riveted Pipe, of which the following is a specification.

My invention relates to machines in which a continuous metallic strip or blank is spirally wound into tubular form with its edges overlapping, so as to form a spiral seam, and in which this spiral seam is jointed by riveting said overlapping edges together.

Prominent objects of my invention are to produce a simple, easy-running, and practical machine adapted for the manufacture of such spiral riveted pipe; to reduce to a minimum the number of parts necessary for the efficient operation of the same; to assemble compactly together such necessary parts, so that the machine may be as small as possible, and also so that an attendant in managing the same may have to make no unnecessary movements; to construct the pipe by as few operations as possible and thereby economize in time and power; to adapt the machine for the manufacture of different sizes of tubing and also for the use of metallic strips or blanks of different sizes; to insure a uniformity of diameter in tubing of the same size; to dispense with the use of previously-prepared rivets and thereby render unnecessary the employment of all complicated, expensive, and intricate rivet-feeding mechanisms; to dispense with the use of punches, drills, or like tools for preparing the rivet-holes, and to provide certain features of construction and arrangement tending further to increase the efficiency and usefulness of such machines.

In making spiral riveted pipe or tubing in accordance with my invention the overlapping edges, which form the spiral seam, are joined or secured together by forcing through the same when in an overlapping condition metallic rods or lugs having a thickness suitable for a rivet and a length greater than the total thickness of the two overlapping edges, and by subsequently upsetting simultaneously both the ends which project from the sides of the spiral seam, so as to form such ends into suitable rivet-heads. Among the advantages gained by thus forcing a "rivet-blank," as such lugs or rods may be termed, through the edges which form the spiral seam when the same are in an overlapping condition and by simultaneously upsetting the projecting ends of the same are the following: First, the operation of preparing rivet-holes is rendered unnecessary, and so by one operation is accomplished that which usually requires two; second, no difficulty is experienced by reason of the rivet-holes in the two overlapping edges failing to register, as is the case when such edges are provided separately with such holes and then brought together; third, no opportunity is given for the rivets to drop out of one edge before piercing the other, as is the case when the rivets are inserted in one edge of the blank before the same overlaps the other, and are subsequently forced through the latter when the two edges meet; fourth, the expense and trouble of providing previously-headed rivets is avoided; fifth, all complicated mechanism for handling such headed rivets is dispensed with. These rivet-blanks are conveniently prepared by automatically cutting the same as needed from a continuous length of wire of the proper size.

The machine for carrying out my invention, more particularly described hereinafter, is provided with the following instrumentalities, viz: a cylindrical mandrel about which the continuous blank is wound into tubular form; means for causing an intermittent progression on the part of the blank, so as to wind the same about the mandrel; means for intermittently feeding a length of wire sufficient for a rivet-blank, and a couple of reciprocating heads arranged for reciprocation toward and away from said mandrel. One of these reciprocating heads is adapted to bend the blank into tubular form about the mandrel; to clamp the same during its intervals of rest against the mandrel, so as to hold it firmly during the insertion of a rivet-blank in the spiral seam, and to upset the projecting ends of the rivet-blank previously inserted by compressing such blank between its lower end and the mandrel. This reciprocating head is also provided with mechanism for cutting the wire which is fed intermittently forward into sections or portions suitable for the rivet-blanks. The other reciprocating head is provided with a driver adapted to drive or force the rivet-blanks through the overlapping edges of the seam, and is adapted to operate the cutting mechanism with which the other reciprocating head is provided.

In the accompanying drawings.

Figure 1:
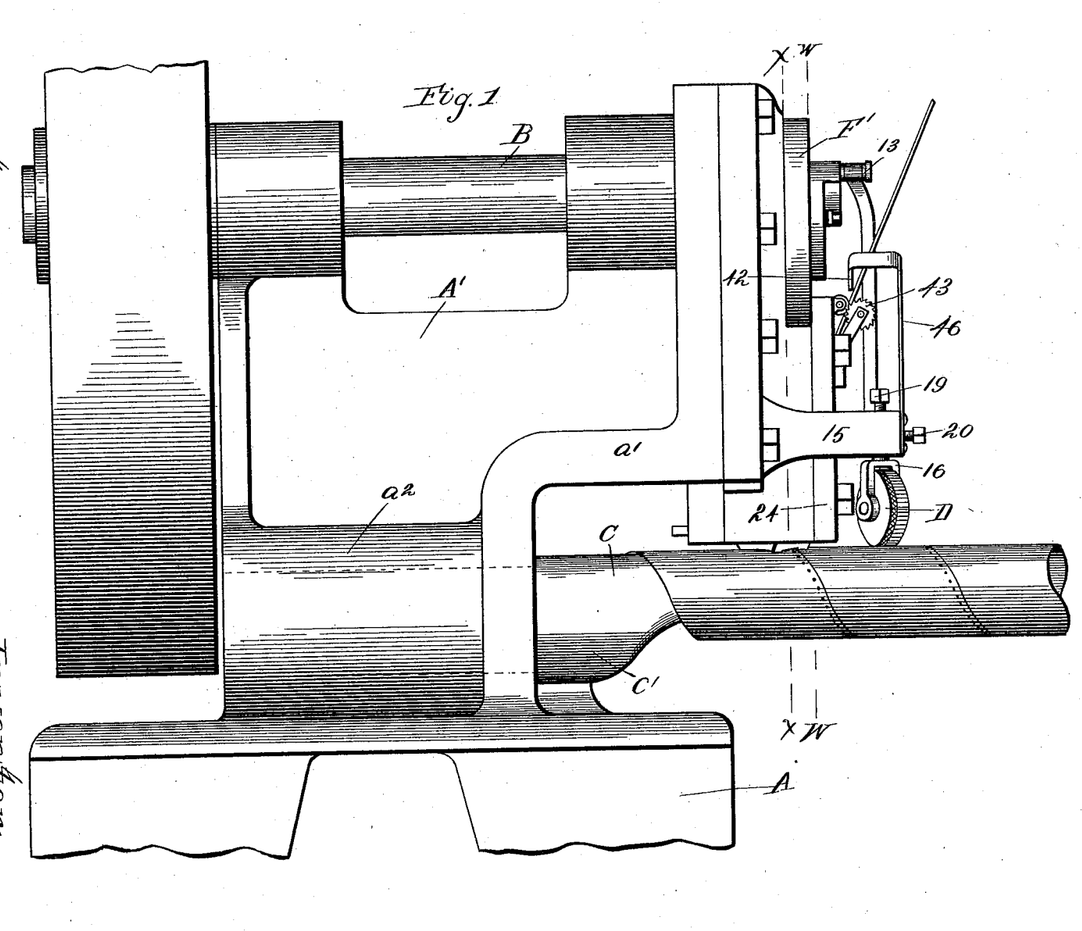
Figure 1 is a side elevation of the upper portion of a machine embodying my invention.

The base or frame A of the machine is supported upon suitable legs, which are not shown, and is provided with an upright or standard A′, Fig. 1. The upright or standard A′ serves as a support for a suitable driving-shaft B, and is constructed with an overhanging portion $a'$, which is adapted for connection with the reciprocating heads.

Arranged below the overhanging portion $a'$ and extending outward from the base $a^2$ of the standard A′ is situated the mandrel C. As illustrated in the drawings, this mandrel C is constructed with an outer or forward cylindrical portion $c$ and an inner or rear thickened portion $c'$. The cylindrical portion $c$ is adapted to give the continuous blank a tubular shape when the same is wound spirally about it, and the portion $c'$ is adapted to prevent breakage of the mandrel at its point of juncture with the machine when the ends of a rivet-blank are upset by compression against it. The mandrel C is also constructed with a cylindrical portion extending longitudinally from the opposite side of the thickened portion $c'$, which cylindric portion is adapted to fit a cylindrical bore formed in the base $a^2$ of the standard A′, as indicated in dotted lines in Fig. 1, and thus to serve as a convenient arrangement for securing the mandrel to the machine. The mandrel C is also provided with a cylindrical end piece C′, (see Figs. 7 and 10,) having an enlarged portion or wheel $c^2$, which is adapted to guide the blank passing over the mandrel in the direction required to wind it properly into tubular form.

The diameter of the cylindrical end piece C′ is the same as that of the cylindric portion $c$ of the mandrel, and its outer end face is situated in a vertical plane lying at an inclination to its axis. The wheel $c^2$ fits against the inclined end face of the end piece C′ and rotates about a sleeve $c^8$. (Shown in dotted lines in Fig. 10.)

In order to adapt the wheel $c^2$ to properly guide the blank when the direction of spiral wind varies—it being observed that such direction varies in accordance with variations in the size of the tubing and the width of the blank—the end portion C′ is connected with the mandrel, so as to be capable of adjustment about a vertical axis, whereby the wheel $c^2$ may be adjusted to various vertical planes, as required.

As a simple and convenient arrangement for connecting the end piece C′ adjustably to the mandrel C the meeting faces of said end piece C′ and the cylindric portion $c$ of the mandrel are correspondingly curved—that of the former being convex and that of the latter being concave—so that in any horizontal section taken longitudinally of the mandrel at such point the line representing these meeting faces is a circular arc; also, the end piece C′ is provided with a bolt $C^2$, which fits within the sleeve $c^8$ and extends through said end piece at right angles to the plane of the wheel $c^2$, and which also has an adjusting-nut $c^5$ at one end and a head $c^6$ at the other end, (shown in dotted lines in Fig. 10,) and the cylindric portion $c$ of the mandrel is provided with a slot $c^3$, which is cut horizontally in its curved face midway between its upper and lower surfaces, and with a second slot $c^4$, which communicates with the slot $c^3$ and is adapted to receive the head $c^6$ of the bolt $C^2$. By such arrangement the wheel $c^2$ can be removed and replaced by a wheel of different diameter when it is desired to vary the size of the tubing, it being observed that an elevation or depression of the forward end of the tubing increases or decreases its size, and thus affords a means of facilitating the maintenance of the tubing at the proper size. By such arrangement, also, when the end piece C′ is fitted to the end of cylindric portion $c$ and the head $c^6$ is fitted within the slot $c^4$ said end piece may be adjusted so as to give the wheel $c^2$ any desired inclination to the longitudinal axis of the mandrel, and when so adjusted it may be locked in adjustment by tightening the nut $c^5$ at the end of the bolt $C^2$.

Figures 10, 11:
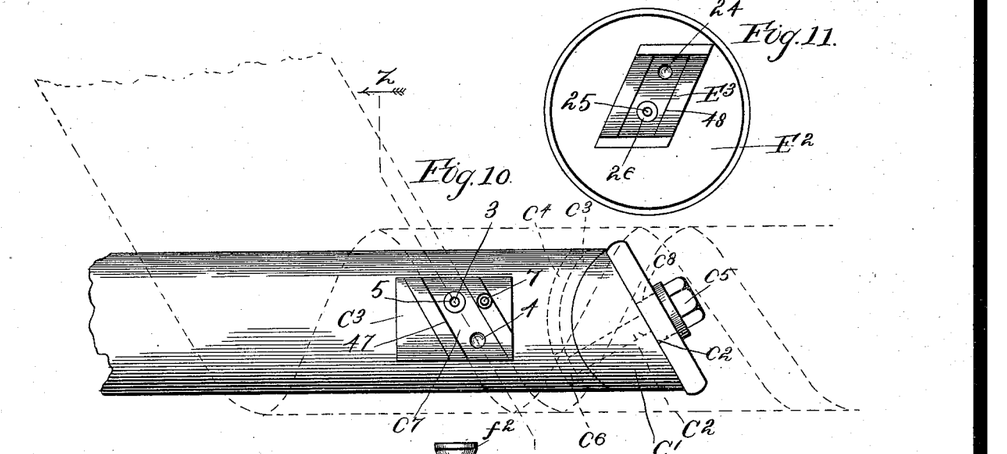
Fig. 10 is a plan view of the outer end of the mandrel.
Fig. 11 is a plan view of the lower surface of one of the reciprocating heads looking upward.
Figure 12:
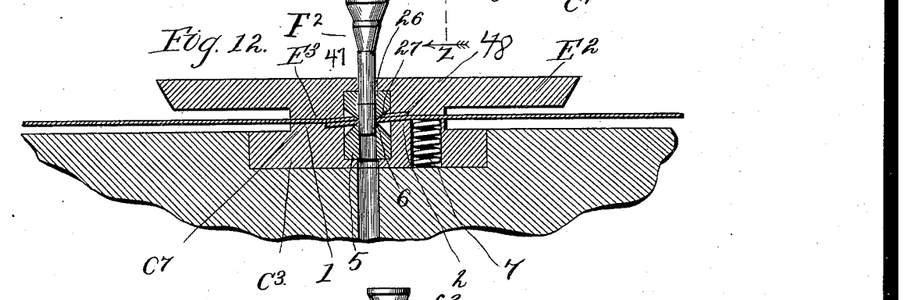
Fig. 12 is a view illustrating the driver and the meeting portions of said head and the mandrel, the former being shown in elevation and the two latter in section, the plane of such section lying longitudinally of the mandrel.
Figure 13:
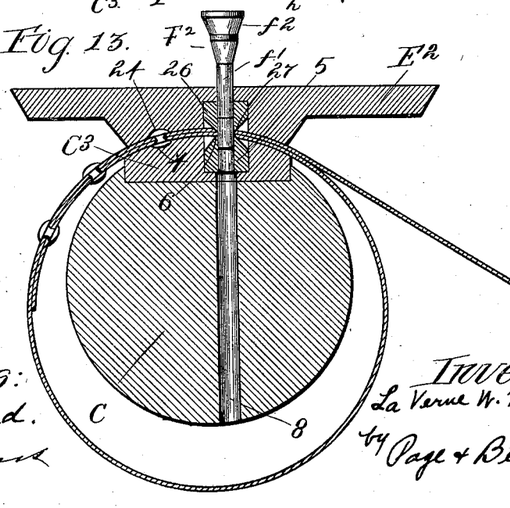
Fig. 13 is a view adapted to illustrate the same features and taken on line $z\ z$ in Fig. 10.

The mandrel C is further provided with a die $C^3$, which is situated in suitable position to receive the overlapping edges of the blank when the same first meet, as shown in dotted lines in Fig. 10, and which is to such end fitted in a suitable socket or recess formed in the upper surface of the cylindric portion $c$. This die $C^3$ is constructed with a raised portion $c^7$, which is adapted to provide a seat for the overlapping edges of the blank and is curved in accordance with the curvature of the particular size of tubing which it is desired to make, as shown in Fig. 13. By such arrangement the metallic blank or strip fed over said seating portion of said die may be compressed by pressure from above and so may be bent to the required degree of curvature. By such arrangement also when a different size of tubing is to be made a die having a differently-curved seating portion can be substituted should it be found that the curvature of the seating portion of the die previously in use does not result in the proper formation of the tube. The die-seat $c^7$ is also provided with a transverse edge 47, which serves as a guide for the rear edge of the completed tube. Owing, however, to the elasticity of the metal blank and to the resulting tendency of the same to spring outward when released from the seat of the die $C^3$ it is found that the tube tends constantly to increase its diameter as it is formed. In order to remedy this objectionable feature, the rear portion 1 of the die-seat $c^7$, considered longitudinally of the mandrel, is formed slightly lower than its forward portion 2, as best shown in Fig. 12. The result of this arrangement is that the blank when first bent is bent downward out of alinement with the top line of the portion of the tubing already formed. Therefore when the portion of the blank over the die is released it springs outward from the die-seat and assumes a position in alinement with said completed portion of the tubing, and therefore a position such as will maintain the diameter of the tubing constant before the spiral seam is riveted. This arrangement is exceedingly simple and inexpensive, and I find it to be perfectly efficient in securing the desired end.

The die $C^3$ is also provided with an aperture 3 and a concave socket 4, both of which are situated in its seat $c^7$. The aperture 3 is adapted to allow a rivet-blank after being driven through the overlapping edges of the spiral seam to project below its surface. This aperture 3 is conveniently provided by a small circular die 5, which is fitted in a suitable socket in the die $C^3$.

The die 5 is desirably constructed with inclined or beveled upper faces 6, which form a circular cutting edge at the periphery of the aperture 3. The presence of this cutting edge facilitates the driving of the rivet-blank through the edges which form the spiral seam by cutting the lower one of such edges when the same is forced down upon it, and the outwardly inclined or beveled faces 6, forming such cutting edge, constitute a matter of further improvement by serving to countersink the cut formed by the cutting edge, whereby an objectionable projection of the rivet-heads beyond the sides of the material can be avoided.

The concave socket 4 is formed in the seat $c^7$ of the die $C^3$ and is situated a distance from the aperture 3 equal to the distance which it is desired shall intervene between the rivets in the spiral seam. The purpose of the socket 4 is to permit the upsetting of the projecting end of each rivet-blank into a suitable rivet-head when such blank is moved to it from the aperture 3 and is compressed against it, as shown in Fig. 13.

It is found that unless suitable provision is made to the contrary the projecting end of the rivet-blank affords an obstacle to its own passage from the aperture 3 to the socket 4. As a simple arrangement for avoiding this trouble a spring 7 is arranged to lift the overlapping edges of the tube-blank when the same are released, and thus permit the rivet-blank to move clear of die $C^3$ during said movement. The spring 7 is desirably a coil-spring and is situated in a suitable socket formed in the seat $c^7$ of the die $C^3$.

In order to permit the escape of the sheet-metal disks which are forced from the overlapping edges of the tube-blank when a rivet-blank is driven through said edges, the mandrel $C$ is provided with a transverse bore or channel 8, which communicates with the lower end of the aperture 3 of the die 5. By such arrangement the sheet-metal disks may pass from the aperture 3 into the channel 8 and thence through and out of the latter into a suitable receptacle.

As a simple arrangement for causing an intermittent progression on the part of the blank, so as to wind the same spirally about the mandrel $C$ and at the same time to allow intervals of rest for the insertion and heading of the rivet-blanks, a suitable feed-wheel $D$ is situated over the mandrel end piece $C'$ and is arranged to bear upon a portion of the completed tube immediately over the peripheral portion $c^2$ of said end piece $C'$. When such wheel $D$ is rotated, it will therefore turn the tube and thereby draw an additional portion of the blank over the mandrel $C$. The feed-wheel $D$ is provided with a milled periphery 8, which is adapted to engage the tube, and is provided also with peripherally-arranged ratchet-teeth 9, whereby an intermittent rotation may be imparted to it. This intermittent rotation is imparted by means of a rod 10, Figs. 2, 3, and 7, whose lower end engages the ratchet-teeth 9 and whose upper end is pivotally and adjustably connected with the driving-shaft $B$. The form of connection shown consists of a pin or stud 11, which has a head arranged to fit in a slot 14, formed in a plate 12, which latter is secured to the outer end of the shaft $B$. The pin 11 serves as a pivot for the rod 10 and has an adjusting-head 13, whereby it may be loosened and adjusted in the slot 14, so as to vary the throw of the rod 10, as required. Said wheel D is conveniently supported by an arm 15, Fig. 3, and to such end is mounted in a forked bracket 16. This bracket 16 has a cylindric extension 17, which fits adjustably in a socket 18, provided for it in the arm 15. As a means of adjusting said wheel D and locking the same in adjustment the arm 15 is provided with an adjusting-screw 19, which is connected with the upper end of the cylindric extension 17 and with a locking-screw 20, which is arranged so that it can be screwed in against said extension 17.

The foregoing constitutes an efficient and satisfactory feed mechanism. It can be easily adjusted to different sizes of material by adjusting the feed-wheel vertically and can be adapted to the direction of spiral wind by adjusting the plane of rotation of said feed-wheel in accordance with corresponding adjustments of the wheel $c^2$ of the mandrel end piece C′. It can be adjusted in such manner without disturbing the tubing or the other parts of the machine, for it is entirely exposed and completely isolated. Furthermore, it dispenses with the complicated oscillating or rolling mandrels or formers heretofore employed as a means of winding the blank into tubular form. Also arranged over the mandrel C are the forming and driving heads E and F, respectively. As a convenient arrangement for reciprocating these heads toward and away from the mandrel C the shaft B is provided with a couple of eccentrics B′ and $B^2$, and the heads are provided at their upper ends with yokes E′ and F′, respectively. The yokes E′ and F′ are adapted to fit over the wearing collars or rings $b'$ and $b^2$, respectively, which latter inclose the eccentrics B′ and $B^2$. As it is found desirable to retain the forming-head E momentarily at the bottom of its downstroke during the insertion of the rivet-blank through the spiral seam, the yoke E′ is provided at its lower end with a wearing-surface $e'$, which is a circular arc having as its radius the radius of the outer periphery of the collar $b'$, as shown in Fig. 5, whereby the rotation of the eccentric fails to lift said head E until the collar $b'$ has passed to one side of said wearing-surface $e'$.

The wearing-surface $e'$ is conveniently provided by a block or piece $e^2$, which is fitted in a suitable socket in the lower portion of the yoke E′.

The centers of the eccentrics B′ and $B^2$ are situated on the same side of the center of the shaft B, so that the reciprocation of the heads shall be in unison. A circular plate or disk $B^3$, having a diameter greater than the diameter of the eccentric $B^2$, is secured to the outer face of said eccentric, and thereby serves as a holder for keeping the collar $b^2$ thereon and also as a support for the plate 12, which operates the feed mechanism.

Figure 5:
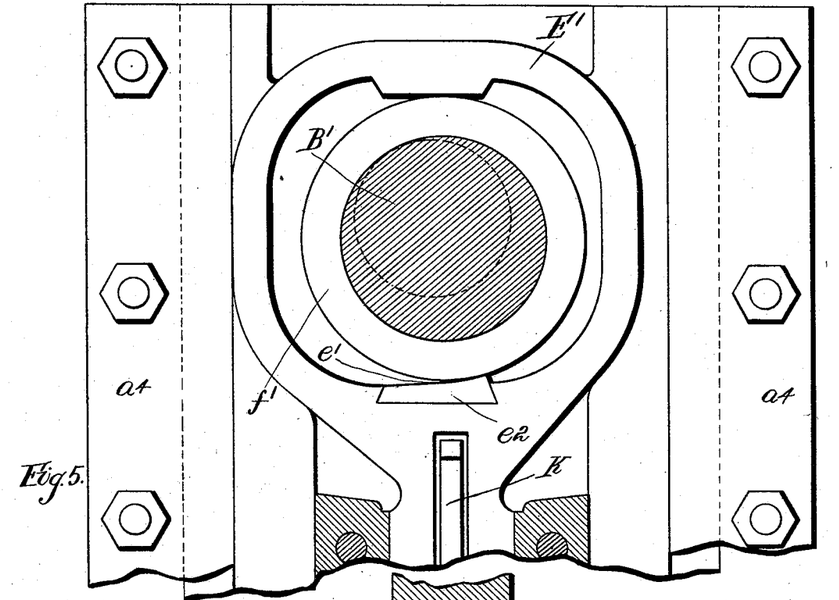
Fig. 5 is a similar vertical section taken on line $x\ x$ in Fig. 1 with the lower portion of the view omitted.
Figures 6, 8, 9:
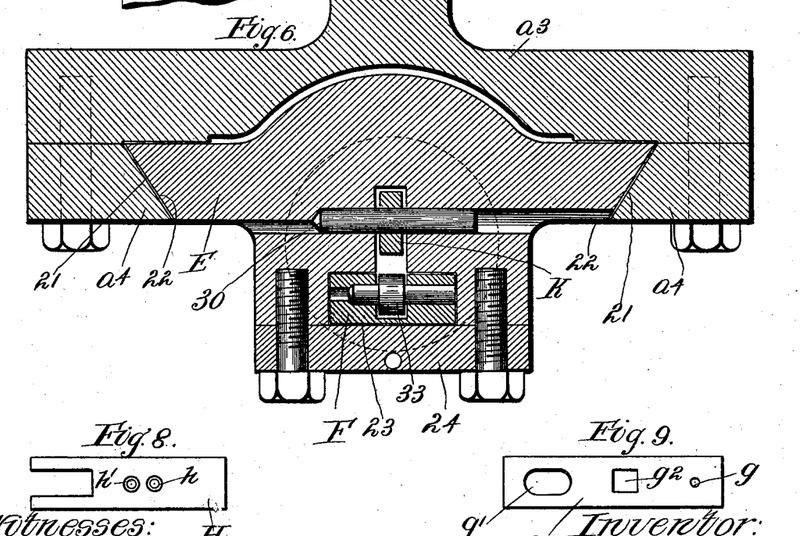
Fig. 6 is a horizontal section taken on line $y\ y$ in Fig. 3, on the same scale as that of Figs. 4 and 5, with some of the details illustrated in Fig. 3 omitted.
Figs. 8 and 9 are plan views of details of the cutting mechanism.

An arrangement by which suitable guideways for said reciprocating heads are provided is illustrated in Figs. 5 and 6. In this arrangement the head E works against a suitable working plate $a^3$, which constitutes the outer face of the overhanging portion $a'$ of the standard A′, and is retained in position against the same by means of the guide-plates $a^4$, which are secured to said working plate $a^3$ by suitable bolts. These guide-plates $a^4$ are constructed with inwardly-inclined vertical working faces 21, which fit against the correspondingly inclined vertical sides 22 of the head E. In this arrangment also the reciprocating head F is arranged to work in a slot or guideway 23, formed longitudinally of the head E in its front face, and is confined within said slot or guideway by a guide-plate 24, secured to the head E against said front face. By such arrangement the reciprocating heads are closely assembled, an undesirable number of guideways is unnecessary, and the size of the machine reduced to a minimum.

The forming-head E is adapted to bend the blank into tubular shape over the mandrel C and at the same time to clamp the spiral seam firmly during the insertion therein of a rivet-blank. To such end said head has its lower end or sole $E^2$ provided with a die portion $E^3$, which is curved correspondingly with the seat of the mandrel-die $C^3$ and is situated so as to fit over such seat when the head E is at the bottom of its downstroke, as best shown in Figs. 12 and 13. The forward and rear portions of the die $E^3$ are also out of alinement in accordance with the difference in the level of the forward and rear portions of the seat of the mandrel-die. The die $E^3$ is also provided with a transverse edge 48, which serves as a guide for the forward edge of the blank. The head E is also adapted to upset a rivet-blank after such blank has been inserted through the overlapping edges of the spiral seam, and to such end is provided with a concave socket 24, Fig. 11, which is situated so as to register with the socket 4 of the mandrel C.

The head E contains, as aforesaid, the mechanism for cutting a continuous length of wire into rivet-blanks. In order to allow the insertion of these blanks into the spiral seam, the sole of said head has an aperture 25, (see Fig. 11,) adapted to allow the outward passage of the rivet-blank and situated so as to register with the aperture 3 in the mandrel. The lower portion of the aperture 25 is desirably provided by a circular die 26, similar to the die 5 of the mandrel and having a circular cutting edge formed by beveled edges 27. This die 26 is fitted in a suitable socket formed in the die portion $E^3$. By such arrangement the forming-head E when it descends bends the blank about the mandrel, so as to form the tube, and clamps the spiral seam firmly, so as to insure the proper insertion of a rivet-blank, by compressing the same between the die-seat $c^7$ and the die portion $E^2$. It also cuts the overlapping edges of the spiral seam, so as to facilitate such insertion of the rivet-blank, by compressing the same between the circular cutting edges of the dies 5 and 26, and further upsets the projecting ends of the previously-inserted rivet-blank by compressing the same between the concave sockets 4 and 24. As previously set forth, the portion of the blank compressed between the dies is bent out of alinement with the completed portion of the tubing, and hence when the head rises the portion of the tube thus formed springs upward and outward and assumes the normal size of the tubing.

Figure 7:
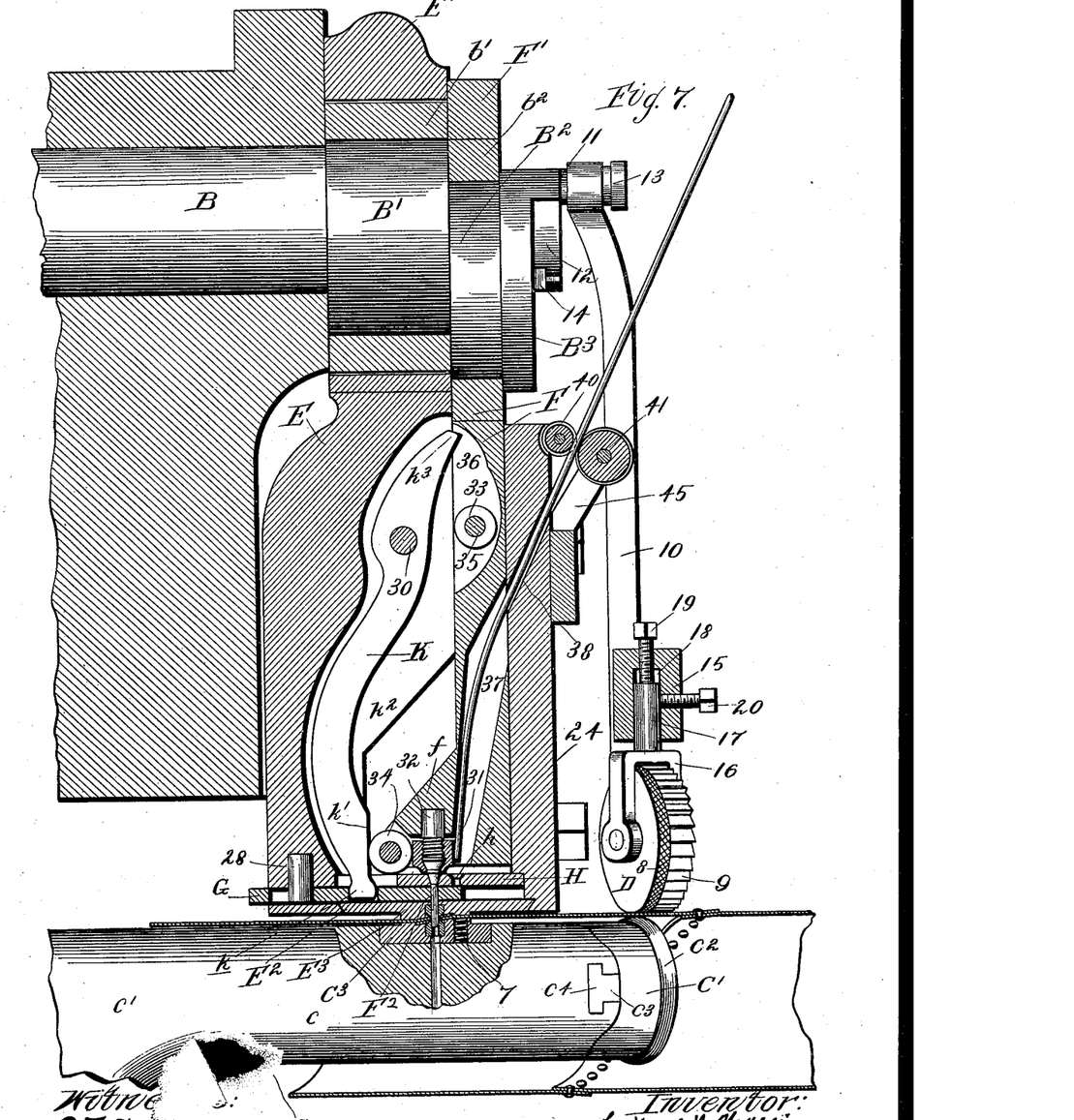
Fig. 7 is a vertical section of the reciprocating heads, taken longitudinally of the mandrel.

The wire for the rivet-blanks is cut into suitable sections or lengths by means of a cutting-slide G, which is illustrated in Figs. 7 and 9. This cutting-slide G has an aperture $g$, adapted to receive the wire, and is confined between the sole $E^2$ and a cutting-abutment H, Fig. 8, arranged transversely of said head E above its sole $E^2$. The cutting-abutment H has a couple of apertures $h$ and $h'$, whereof the former is adapted to receive the wire when the same is fed downward and the latter is situated in alinement with the aperture 25 of the sole $E^2$ and is adapted to receive the driver when the same descends to drive the rivet-blank through the spiral seam.

The slide G is arranged for sliding movement, so that its aperture $g$ may be brought alternately into register with the apertures $h$ and $h'$ of the abutment H, and it is limited to such extent of sliding movement by a stop 28, which is inserted in the sole $E^2$ and which works in a slot $g'$, formed in said slide. By such arrangement wire may be fed into the aperture $h$ of the abutment H and into the aperture $g$ in the slide G, when such apertures register with one another. The slide G may then be moved to the left, Fig. 7, so as to cut off the portion of wire contained by its aperture $g$, and may continue its movement in that direction until the aperture $g$ registers with the aperture $h'$, and therefore with aperture 25. The rivet-blank is then in position to be driven out of the slide G and into and through the spiral seam, it being observed that the slide G serves as a holder for the rivet-blank and also that the length of the rivet-blank is equal to the thickness of the slide G.

The cutting-slide G could be operated by any suitable mechanism in such a manner as to bring the rivet-blank into register with the apertures $h'$ and 25 at a time when the head E is in its lowest position. As a matter of further improvement, however, said slide is operated by the other reciprocating head (the driving-head F) by means of the lever K. This lever K is inclosed in a suitable space formed in the body of the head E and is supported by a transversely-arranged pivot 30, so as to swing in a plane lying longitudinally of the head and intercepting the axis of the shaft B, as shown in Fig. 7.

The lower end or nose $k$ of the lever K is curved or rounded and is adapted to engage the slide G by means of a slot $g^2$, formed in the latter, so as to operate the same by its swinging motion. The edge $k'$ of the portion of the lever K lying immediately above its nose $k$ is straight and the edge $k^2$ of the portion lying between the edge $k'$ and the pivot 30 is curved inwardly or concaved. The upper end $k^3$ of said lever projects beyond the front face of the head E when the slide G is in its left-hand position, as shown in Fig. 7. The lever K is operated by the driving-head F, as will be hereinafter described.

The driving-head F is provided at its lower end with a foot $f$, which projects inwardly over the abutment H of the head E. This foot $f$ carries the driver $F^2$, which is adapted to drive the rivet-blank out of the aperture of the cutting-slide G and through the overlapping edges forming the spiral seam. The driver $F^2$ could be of any construction suitable for such purpose, the form shown consisting of a straight cylindric portion $f'$, which is adapted for easy insertion in the apertures $h'$, $g$, and 25, so as to pass through the same while driving the rivet-blank into the spiral seam. By such arrangement said apertures serve as guideways for the driver $F^2$ and tend to prevent a deviation or bending of the same when forcing the rivet-blank downward. As a convenient arrangement for securing the driver $F^2$ detachably to the head F, said driver is constructed with an enlarged head $f^2$ at its upper end, and a removable cap 31 is arranged to engage the head $f^2$ and draw the same against a suitable abutment provided by the driving-head F.

The cap 31 is constructed with an aperture adapted to allow the cylindric portion $f'$ of the driver $F^2$ to slide therethrough until the head $f^2$ is reached, and also with a threaded socket formed as a continuation of said aperture and adapted to allow the passage of the head $f^2$ and adapted also to fit the threaded end of a stud 32, which is secured to the portion of the foot $f$. By such arrangement the driver $F^2$ is secured to the driving-head F by passing the cylindric portion $f'$ of the former through the opening in the cap 31 until the head $f^2$ is engaged at the bottom of the threaded socket and by then screwing said cap 31 upon the threaded end of the stud 32 until the upper surface head $f^2$ abuts against the lower surface of the stud 32. The driver $F^2$ is thus secured firmly to the driving-head and can be easily removed and replaced or repaired by unscrewing the cap 31.

Although the eccentric $B^2$, operating the driving-head F, is situated on the same side of the center of the shaft B as the eccentric $B'$, operating the forming-head E, the throw or eccentricity of said eccentric is greater than that of the eccentric $B'$, whereby the driving-head F reciprocates farther and more rapidly than the forming-head E. This difference in throw or eccentricity is just sufficient to cause the proper working of the driver $F^2$ with reference to the forming-head E—that is to say, after the driver has reached its lowest position, having just finished forcing a rivet-blank from the cutting-slide G into the spiral seam, as indicated in Fig. 7—and when the two heads E and F are rising together the driving-head F rises a greater distance than the forming-head E, which difference in rise is sufficient to withdraw the driver F² from the aperture h' in the abutment H and allow the proper movement of the cutting-slide G.

As a means of swinging the lever K so as to operate the cutting-slide G the driving-head F is provided with a couple of rollers or wheels 33 and 34. The roller 33 is mounted upon a suitable pin 35, Fig. 6, within a space or chamber 36, formed in said head F, and is adapted to strike the upper end k³ of the lever K when said head F has gained sufficiently on the head E to bring the two together. This striking of the lever end k³ by the roller 33 will result in a movement of the cutting-slide G to the right, Fig. 7.

The roller 34 is suitably mounted upon the foot f of the driving-head F and is adapted to roll along the curved and straight edges k² and k' of the lever K as the head F gains upon the head E during their downstrokes. While rolling along the curved edge k² the roller 34 drives the cutting-slide G to the left and while rolling along the straight surface k' it holds said slide in that position. By such arrangement the driver of the driving-head forces a rivet-blank through the cutting-slide and through the aperture in the sole of the forming-head into the spiral seam at a time when said forming-head is at the bottom of its downstroke and operating to bend the blank into tubular form and also to upset the end of the previously-inserted rivet, and also is withdrawn from the cutting-slide during the upward stroke of said forming-head, and, furthermore, the cutting-slide is moved so that its aperture is moved from out of register with the aperture in the sole of the forming-head into register with the aperture in the cutting-head through which the rivet-wire is fed, and thence back again, so as to cut off a portion of such wire for a rivet-blank and to place and hold the same in position for insertion into the spiral seam at a time when the driver is withdrawn from its aperture, it being observed that such movement of the cutting-slide is the result of a relative movement on the part of the two reciprocating heads. This arrangement of reciprocating heads provides an exceedingly compact and effective means for making spiral riveted pipe or tubing. The bending of the blank into tubular form, the holding and partial cutting of the overlapping edges forming the spiral seam, the cutting of the rivet-wire into rivet-blanks, the insertion of one of such blanks into the spiral seam, and the upsetting of the projecting ends of the previously-inserted rivet-blank are all accomplished by a single stroke on the part of the heads. The movements are simple and there is no lost motion on the part of the various mechanisms. The use of power and material is economical, and there is no unnecessary friction and no vibration or jarring.

It will be understood that the reciprocating heads and the mechanism for intermittently winding the tube-blank about the mandrel are connected with the driving-shaft in such a manner that when said heads are at the bottom of their downstrokes and operating to form the tubing the said feed mechanism is inactive, but that after said heads have risen, leaving the tube free to move, the said feed mechanism operates to turn the tube the proper distance.

The rivet-wire could be fed to the aperture h of the cutting-abutment H by any suitable means, the driving-head F and the plate 24 having channels 37 and 38, respectively, for such purpose, as shown in Fig. 7.

Figure 2:
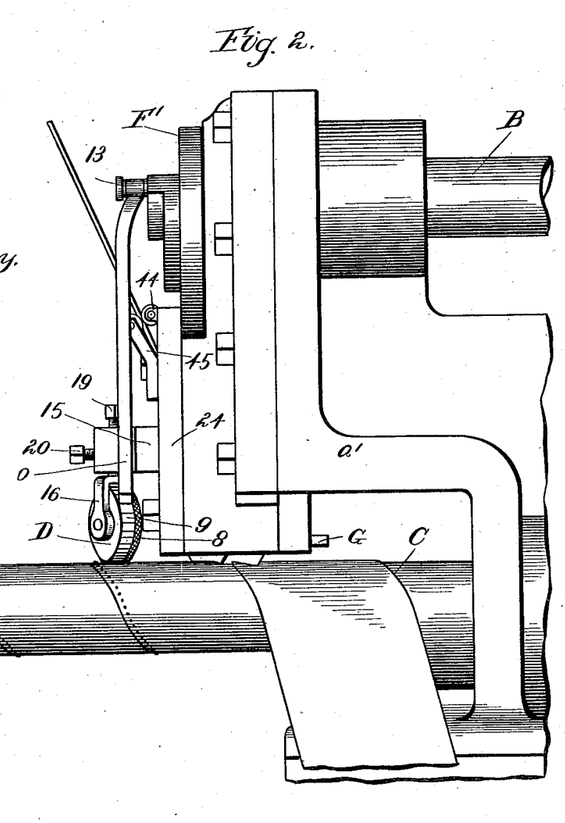
Fig. 2 is a similar side elevation of a part of the same, taken from the opposite side of the machine.
Figure 3:
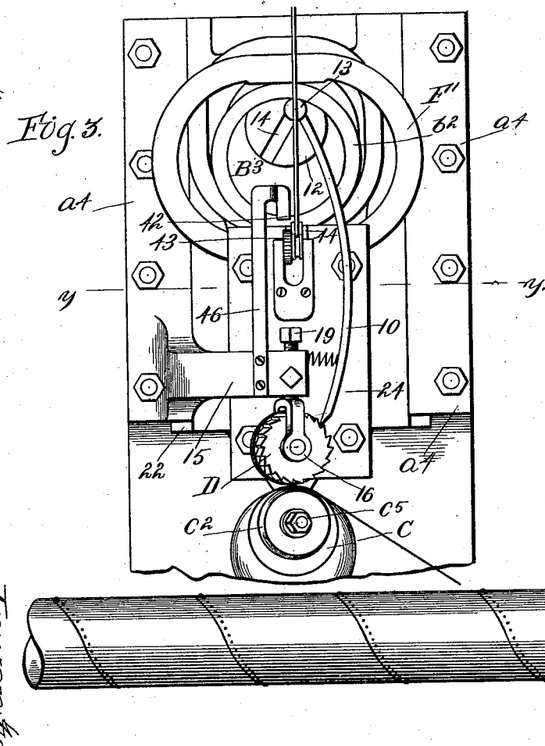
Fig. 3 is an end elevation of said upper portion.
Figure 4:
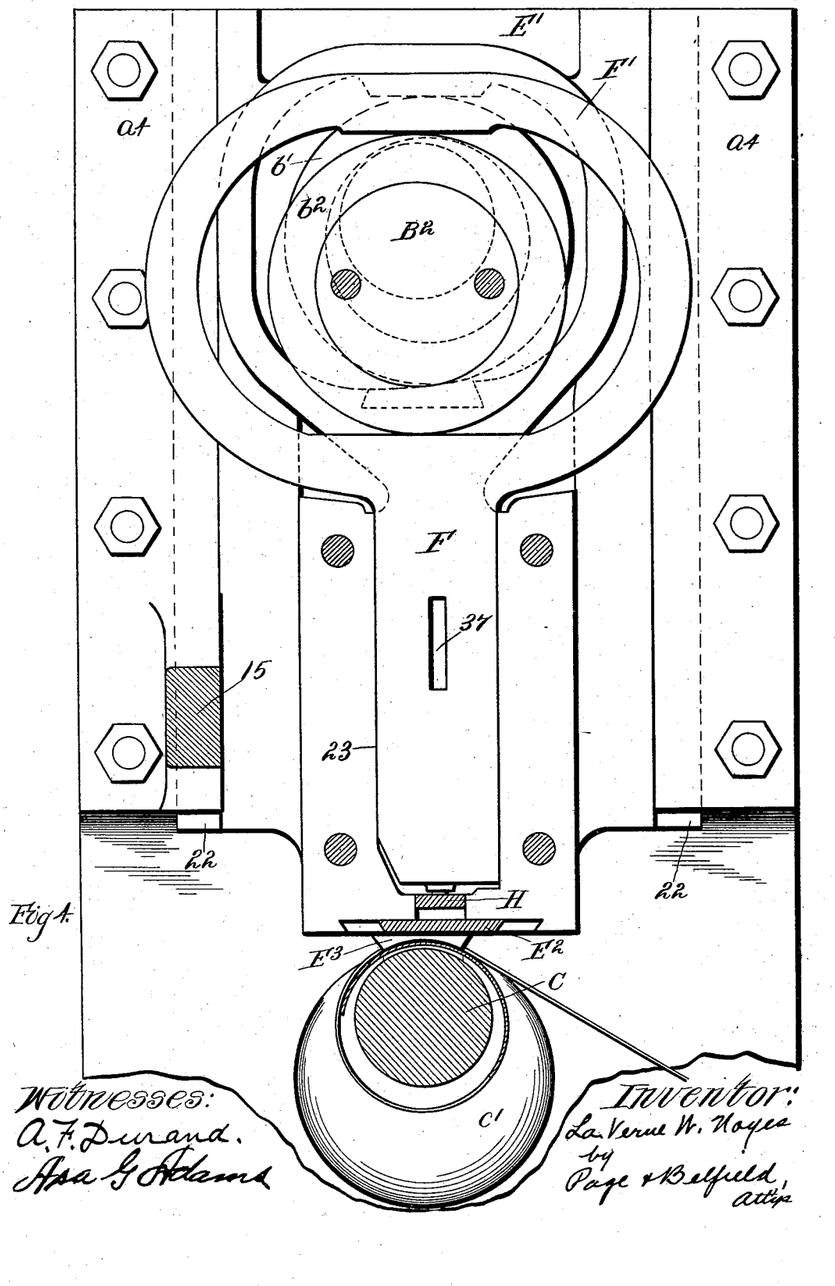
Fig. 4 is a vertical section taken on line $w\ w$ in Fig. 1 on a larger scale.

As a simple arrangement a couple of feed-wheels 40 and 41 are carried by said plate 24, and a stationary blade 42, Fig. 3, is situated so as to engage the ratchet-teeth 43, with which the wheel 41 is provided, when said wheels 40 and 41 are lifted as a result of the reciprocation of the driving-head F, to which said plate 24 is secured. The feed-wheels 40 and 41 are conveniently mounted upon suitable brackets 44 and 45, respectively, both of which are secured to the plate 24, as shown in Figs. 2 and 3, and the blade 42 is conveniently provided with a rod 46, Figs. 1 and 3, secured to and extending upward from the arm 15, which latter is formed integral with one of the guide-plates a⁴. By such arrangement the wire is fed downward by an intermittent rotation of the feed-wheel 41, which rotation is caused by the teeth of said wheel striking the blade 42 during the last portion of the upstroke of the driving-head F, it being observed that at such time the aperture in the cutting-slide G registers with the aperture in the cutting-head H preparatory to receiving such wire. Thus the wire is fed downward at the proper time, and the pitman and pawl mechanisms usually employed for operating the feed-wheels are dispensed with.

The machine herein described operates easily and satisfactorily and produces a neat, uniform, and well-jointed pipe or tubing. As such machine is, however, naturally capable of more or less modification, it is not intended to limit the invention to the precise arrangement and construction set forth.

It is obvious that I can rivet flat metal blanks, cylindrical structures having straight longitudinal or transverse seams, and the like, in accordance with the method and by the use of the arrangement hereinbefore set forth or a modification of such arrangement. Hence I do not intend to limit the broader features of my invention to machinery for making spiral riveted pipe.

What I claim is—

1. In a machine for making spiral riveted pipe, the combination with the mandrel or like riveting-abutment, of feeding means for causing an intermittent progression on the part of the blank so as to wind the same into tubular form; a driver adapted for forcing unheaded rivet-blanks through the spiral seam thus formed; means for simultaneously upsetting both ends of the rivet-blank; and mechanism for operating the feeding means, and also for actuating the driver and the upsetting means during the intervals of rest on the part of the blank, as set forth.

2. In a riveting-machine, the combination of an abutment adapted to have a plurality of sheet-metal blanks superposed upon it; a driver adapted to force a rivet-blank into such sheet-metal blanks when the latter are in a superposed condition; a movable rivet-blank holder arranged to receive the rivet-blanks and place them successively in position for insertion into the sheet-metal blanks and adapted to serve as a guide for such rivet-blanks so as to counteract their tendency to bend, spring or buckle during insertion; and mechanism for operating the driver, as set forth.

3. In a riveting-machine, the combination of an abutment adapted to have a plurality of sheet-metal blanks superposed upon it; a reciprocating driver adapted to force rivet-blanks into such sheet-metal blanks when the latter are in a superposed condition; a reciprocating rivet-blank holder which is provided with an aperture adapted to receive a rivet-blank and adapted also to serve as a guide both for the blank and the driver, and which is arranged to place such blanks successively in position for insertion by the driver; and mechanism for reciprocating the driver and the rivet-blank holder in alternation, as set forth.

4. In a riveting-machine, the combination of an abutment adapted to have superposed upon it a plurality of sheet-metal blanks; a driver adapted to force rivet-blanks successively into such sheet-metal blanks when the latter are in a superposed condition; a holder for receiving the rivet-blanks and for placing the same successively in position for insertion into the sheet-metal blanks; means for upsetting the rivet-blank ends which project after insertion from the farther side of the sheet-metal blanks; mechanism for operating the driver and the upsetting means so as to cause the substantially simultaneous insertion of a rivet-blank and upsetting of the projecting end of the next preceding blank; and power-transmitting connection for operating the holder so as to place the rivet-blanks successively in position for insertion into the sheet-metal blanks, as set forth.

5. In a riveting-machine, the combination of an abutment adapted to have superposed upon it a plurality of sheet-metal blanks; a driver adapted to force unheaded rivet-blanks successively into the sheet-metal blanks when the latter are in a superposed condition; a holder for receiving such rivet-blanks and for placing the same successively in position for insertion into the sheet-metal blanks; means for simultaneously upsetting both projecting ends of the rivet-blanks thus inserted; means for causing an intermittent progression on the part of the sheet-metal blanks so as to carry the inserted rivets to the upsetting means; mechanism for operating the driver and the upsetting means so as to cause the substantially simultaneous insertion of one rivet-blank, and upsetting of the ends of the next preceding blank during the intervals of rest on the part of the sheet-metal blanks; and power-transmitting connection for actuating the feeding means and the holder during the intervals intervening between the successive insertion of the rivet-blanks, as set forth.

6. In a riveting-machine, the combination of an abutment adapted to have a plurality of sheet-metal blanks superposed upon it; means for intermittently feeding to the machine wire suitable for rivet-blanks; a cutting device for cutting the wire thus fed into lengths suitable for rivet-blanks; a driver adapted to force such rivet-blanks successively into the sheet-metal blanks when the latter are in a superposed condition; a holder for receiving the rivet-blanks and for placing the same successively in position for insertion into the sheet-metal blanks; means for simultaneously upsetting both projecting ends of the rivet-blanks thus inserted; mechanism for operating the driver and the upsetting means so as to cause the substantially simultaneous insertion of a rivet-blank and upsetting of the projecting ends of the next preceding rivet-blank; and power-transmitting connection for actuating the wire-feeding means, the cutting device, and the rivet-blank holder during the intervals intervening between the successive insertions of rivet-blanks, as set forth.

7. In a riveting-machine, the combination of an abutment adapted to have a plurality of sheet-metal blanks superposed upon it; means for causing an intermittent progression on the part of such blanks; a cutting device for cutting the wire thus fed into lengths suitable for rivet-blanks; a driver adapted to force such rivet-blanks successively into the sheet-metal blanks when in a superposed condition; a holder for receiving the rivet-blanks and for placing the same successively into position for insertion; means for simultaneously upsetting both ends of the rivet-blanks which project after insertion; means for causing an intermittent progression of the sheet-metal blanks so as to carry the inserted rivets to the upsetting means; mechanism for operating the driver and the upsetting means so as to cause the substantially simultaneous insertion of a rivet-blank and upsetting of the ends of the next preceding blank; and power-transmitting connection for actuating the sheet-metal blank-feeding means, the wire-feeding means, the cutting device, and the rivet-blank holder during the intervals intervening between the successive insertions of the rivet-blanks, as set forth.

8. In a riveting-machine, the combination of an abutment adapted to have a plurality of sheet-metal blanks superposed upon it; a couple of reciprocating heads situated on the same side of the abutment and arranged for substantially synchronous reciprocation toward and away from the same, one of said heads being provided with a driver adapted to force the rivet-blanks successively into the sheet-metal blanks when the latter are in a superposed condition, and the other being arranged to upset the projecting ends of the rivet-blanks thus inserted; means for causing an intermittent progression on the part of the sheet-metal blanks so as to carry the inserted rivets to the upsetting-head; mechanism for operating the reciprocating heads; and power-transmitting connection for actuating the feeding means during the intervals intervening between the successive insertions of rivet-blanks, as set forth.

9. In a machine for making spiral riveted pipe, the combination of a mandrel about which the blank can be spirally wound into tubular form; means for causing an intermittent progression on the part of the blank so as to wind the same into such tubular form; means for feeding wire suitable for rivets to the machine; a cutting device for cutting such wire into lengths suitable for rivet-blanks; a holder for successively placing and holding the rivet-blanks in position for insertion into the spiral seam; a driver adapted to force such blanks out of the holder and into the spiral seam; means for simultaneously upsetting the rivet-blank ends projecting from the opposite sides of the spiral seam so as to form heads thereof; mechanism for operating the driver; and power-transmitting connection for operating the other instrumentalities during the periods intervening between the successive insertions of rivet-blanks, as set forth.

10. In a riveting-machine, the combination with an abutment, of a couple of reciprocating heads arranged for substantially synchronous reciprocation toward and away from said abutment, one of said heads being provided with a driver adapted to force rivet-blanks through metal placed upon the abutment, and the other being adapted to upset the ends of the rivet-blank previously inserted; and mechanism for cutting wire into rivet-blanks and placing the blanks thus cut into position to receive the driver, said mechanism being carried by the former reciprocating head, and arranged for operation by the latter one, as set forth.

11. In a riveting-machine, the combination, with an abutment, of the forming and driving heads arranged for substantially synchronous reciprocation through unequal distances toward and away from the abutment, the forming-head being adapted to upset the projecting ends of rivet-blanks, and being provided with a suitably-arranged cutting-slide and also with a lever for operating the same, and the driving-head being provided with a driver arranged to work in and out of an aperture in the cutting-slide, and being adapted to actuate the cutting-slide lever, as set forth.

12. In a riveting-machine, the forming and driving reciprocating heads fitted together so that one works in a guideway provided by the other, the former being adapted for upsetting purposes, and the latter being provided with a driver; eccentrics having unequal throws for operating the same; a cutting-abutment situated near the bottom of the forming-head and having a couple of apertures whereof one is adapted to receive the feed-wire for the rivet-blanks, and the other is adapted to serve as a guide for the driver and is situated in alinement with the aperture for the outlet of the rivet-blanks with which the sole of said head is provided; an apertured cutting-slide confined between said cutting-abutment and arranged for sliding movement so as to allow its aperture to register with one or the other of the apertures of the cutting-abutment; and a pivotally-supported lever adapted to engage said cutting-slide and arranged to be operated by the driving-head so as to bring the aperture of the cutting-slide into register with the feed-aperture of the cutting-abutment at a time when the heads are at the top of their strokes, and into register with the driver-aperture of the same when the heads are approaching the bottom of their strokes, substantially as described.

13. In a riveting-machine, the combination of an abutment adapted to receive a plurality of metal blanks preparatory to riveting and provided with a cutting edge adapted to form a rivet-hole cut in the lowermost blank; and a driver arranged opposite such cutting edge and adapted for forcing rivet-blanks into the sheet-metal blanks when the latter are arranged upon the abutment and above its cutting edge, as set forth.

14. In a riveting-machine having a driver adapted to force the rivet-blanks through the sheet metal, an abutment and means for clamping the sheet metal upon the same, said abutment and clamping means being provided with oppositely-arranged cutting edges adapted to facilitate the insertion of the rivet-blank, as set forth.

15. In a machine for making spiral riveted pipe, the combination of the mandrel having a curved tube-bending seat whose rear portion is lower than its forward portion; and a reciprocating tube-bending member arranged opposite the mandrel and provided with a correspondingly-curved and rearwardly-depressed face situated opposite said seat, as set forth.

16. In a machine for making spiral riveted pipe, the mandrel adapted to shape the tubing, the feed-wheel arranged over the mandrel so as to bear upon a completed portion of the tube and means for intermittently operating the feed-wheel, as set forth.

17. In a machine for making spiral riveted pipe, the mandrel provided with an end piece having a rotary wheel, the mandrel and end piece being constructed with correspondingly-curved meeting faces and being fitted adjustably together by means of a headed bolt which extends through said end piece and fits adjustably in suitable circular slots with which the end of the mandrel is provided, as set forth.

18. In a riveting-machine, the combination of the forming-head, an eccentric for operating the same, and a yoke engaging the eccentric, said yoke being provided with a curved wearing-surface consisting of an arc of a circle having as its radius, a radius of the outer periphery of the eccentric which it engages, as set forth.

19. In a riveting-machine, an abutment adapted to support metal sheets or the like and having an aperture adapted to receive the rivet-blanks; means for inserting the latter through the metal sheets; and a spring adapted to lift such sheets when the same are released, as set forth.

20. A spiral-pipe machine comprising a suitable mandrel; means for effecting an intermittent progression of the blank so as to wind the same about the mandrel; a forming-head adapted to bend the blank about the mandrel, to clamp the spiral seam against the same, and to upset rivets inserted through such seam; mechanism carried by said forming-head and adapted to cut wire into rivet-blanks and to place the same in position for insertion into the spiral seam; means for feeding the wire to said cutting mechanism; a driving-head adapted to operate said cutting and placing mechanism and provided with a driver adapted to force the rivet-blanks through the spiral seam; and mechanism for operating the feeding means and for reciprocating said heads so as to cause their movement toward the mandrel at a time when the tubing-blank is at rest, as set forth.

21. In a machine for making spiral riveted pipe, the combination of the mandrel provided with a concave socket adapted to form a rivet-head, means for causing an intermittent progression on the part of the blank so as to wind the same about the mandrel; a reciprocating head having a corresponding socket for a rivet-head and arranged to upset both ends of the rivet-blank simultaneously by compressing the same between itself and the mandrel; and mechanism for operating the feeding means, and for reciprocating said head so as to cause the compression of the rivet-blank at a time when the tubing-blank is at rest, as set forth.

22. In a machine for making spiral riveted pipe, the combination of the mandrel adapted to form the tubing; means for causing an intermittent progression on the part of the blank so as to wind the same about the mandrel; means for placing rivet-blanks in suitable position for insertion into the spiral seam; means for upsetting the rivet-blank ends which are forced through the spiral seam and project from its inner side; a driver adapted to force such blanks through the seam; and mechanism for operating the driver, and the feeding, placing and upsetting means between the strokes of the driver, as set forth.

23. In a machine for making spiral riveted pipe, the combination of the mandrel, means for causing an intermittent progression on the part of the blank so as to wind the same about the mandrel; a suitably-mounted cutting-slide adapted to cut wire into rivet-blanks and place the same into position for insertion in the spiral seam; means for feeding the wire to said slide; a driver arranged to force such rivet-blanks through the spiral seam; means for upsetting the rivet-blank ends which project from the opposite sides of such seam; mechanism for operating the driver; and power-transmitting connection for operating said instrumentalities between the strokes of the driver, as set forth.

24. In a machine for making spiral riveted pipe, the combination of the mandrel having a transverse aperture, and provided with a cutting edge which forms the upper end of said aperture; means for causing an intermittent progression on the part of the blank so as to wind the same about the mandrel; a driver arranged to force rivet-blanks through the spiral seam at a point above the mandrel-aperture; mechanism for operating the driver; and power-transmitting connections for operating the other instrumentalities between the strokes of the driver, as set forth.

25. In a machine for making spiral riveted pipe, the mandrel provided with a removable die having a curved seating portion and provided also with an aperture and a concave socket, substantially as described.

26. The combination of an abutment adapted to have a plurality of blanks superposed thereupon and provided with an edge adapted to engage the lowermost blank against sliding movement; and an oppositely-arranged clamping member adapted to hold the blanks upon the abutment, and provided also with an edge adapted to hold the uppermost blank against sliding movement in a reverse direction, as set forth.

27. In a machine for making spiral riveted pipe, the combination of the mandrel provided with a seating portion for the blank, and provided also with a diagonal edge adapted to engage the rear edge of a portion of the blank forming the completed tube; and the clamping-head provided with a curved portion adapted to bend the blank over the seating portion of the mandrel and provided also with an edge adapted to engage the forward edge of the unattached portion of the blank, substantially as described.

28. In a riveting-machine, the combination of an abutment adapted to receive a plurality of sheet-metal blanks preparatory to riveting and provided with a cutter adapted to form a rivet-hole cut in the lowermost blank and having a downwardly-divergent face below its cutting edge; and a driver arranged opposite such cutting edge and adapted for forcing rivet-blanks into the sheet-metal blanks when the latter are arranged upon the abutment and above its cutting edge, as set forth.

29. In a riveting-machine, the combination of an abutment adapted to receive a plurality of sheet-metal blanks preparatory to riveting and provided with a cutter adapted to form a rivet-hole cut in the lowermost blank and having a downwardly-divergent face below its cutting edge; reciprocating means adapted for holding the sheet-metal blanks upon the abutment and provided with a corresponding and oppositely-arranged cutter having an upwardly-divergent face above its cutting edge; a reciprocating driver arranged to work within the upper cutting edge and adapted to force rivet-blanks into the sheet-metal blanks; and mechanism for reciprocating the holding means and the driver substantially in unison, as set forth.

30. The combination with the rotary shaft $B$ having the similarly-arranged eccentrics $B'$ and $B^2$, the latter having a greater throw than the former; of the reciprocating head $E$ operated by the eccentric $B'$ and provided with the cutting-abutment $H$ arranged transversely near its lower end and having apertures $h$ and $h'$ whereof the latter is situated in alinement with an aperture formed in the bottom of the head; the reciprocating cutting-slide $G$ working between the cutting-abutment $H$ and the bottom of the head $E$, and having an aperture $g$; the pivotally-supported swinging lever $K$ carried by the head $E$ and engaging the cutting-slide $G$ so as to place the aperture $g$ of the latter alternately into register with the apertures $h$ and $h'$ of the cutting-abutment $H$; the reciprocating head $F$ operated by the eccentric $B^2$ and provided with rollers or wheels 33 and 34 whereof the former is arranged to engage the upper end of the lever $K$ so as to swing such lever forward to an extent to place the aperture $g$ of the slide $G$ into register with the aperture $h$ of the abutment $H$ during the latter portion of the rise of the two reciprocating heads $E$ and $F$, and the latter is arranged to engage the lower end of the lever $K$ so as to swing such lever backward to an extent to place the aperture $g$ of the slide $G$ into register with the aperture $h'$ of the abutment $H$ during the early portion of the descent of the two reciprocating heads $E$ and $F$, and also to engage a substantial portion formed upon said lever $K$ so as to hold the same and thereby the slide $G$ in such position during the latter portion of the descent of such heads; and a driver $F^2$ attached to the lower end of the head $F$ and adapted and arranged to work in the aperture $h'$ of the abutment $H$ and the aperture $g$ of the slide $G$ at a time when such apertures are in register with one another, substantially as described.

LA VERNE W. NOYES.

Witnesses:
   A. F. DURAND,
   ASA G. ADAMS.